United States Patent [19]
Sakashita et al.

[11] Patent Number: 5,579,666
[45] Date of Patent: Dec. 3, 1996

[54] METHOD OF STRIPPING AN INSULATED MAGNET WIRE AND APPARATUS FOR PRACTICING THE METHOD

[75] Inventors: Hiroshi Sakashita; Eiji Arasaki, both of Nagano, Japan

[73] Assignee: Kabushiki Kaisha Sankyo Seiki Seisakusho, Nagano, Japan

[21] Appl. No.: 337,834

[22] Filed: Nov. 8, 1994

[30] Foreign Application Priority Data

Nov. 9, 1993 [JP] Japan .................................. 5-303443

[51] Int. Cl.$^6$ ...................................................... H02G 1/12
[52] U.S. Cl. .............................................. 81/9.42; 81/9.51
[58] Field of Search ................................ 81/9.42–9.44, 81/9.51

[56] References Cited

U.S. PATENT DOCUMENTS

| | | | |
|---|---|---|---|
| 3,344,691 | 10/1967 | Staggs | 81/9.42 |
| 3,527,124 | 9/1970 | Ullman | 81/9.51 |
| 3,735,649 | 5/1973 | Staggs | 81/9.42 |
| 3,821,909 | 7/1974 | Cox | 81/9.42 |

*Primary Examiner*—James G. Smith
*Attorney, Agent, or Firm*—Sughrue, Mion, Zinn, Macpeak & Seas

[57] ABSTRACT

An insulated magnet wire, being pushed against the arcuate guide surface of a guide member, is held in semi-circular stripping cuts formed respectively in a pair of clamping parts forming a clamp tool which are opened and closed by being turned about a fulcrum. Under this condition, the clamp tool 10 is moved along the magnet wire, to cause the semi-circular stripping cuts to strip the magnet wire.

20 Claims, 11 Drawing Sheets

5,579,666

METHOD OF STRIPPING AN INSULATED MAGNET WIRE AND APPARATUS FOR PRACTICING THE METHOD

BACKGROUND OF THE INVENTION

1. Field of the Invention

This invention relates to a method of stripping an insulated magnet wire, and an apparatus for practicing the method. The method and apparatus are to be used when it is required to process the end portion of an insulated magnet wire which has been wound, for instance, with a motor winding machine.

2. Related Art

The term "magnet wire" as used herein is intended to mean an electrical wire which is fabricated by forming an insulating layer of polyamide, poly-urethane or enamel on a conductor.

In an electric motor, a magnet wire is wound on the protruded poles of the armature of the electric motor by using a winding machine as required, and the end portions of the magnet wire are electrically connected to, for instance, soldering terminals on a circuit board on which a motor driving circuit has been formed.

In order to solder the end portions of the magnet wire to the soldering terminals, it is necessary to strip the end portions of the magnet wire; i.e., to remove the insulating layer from it.

For this purpose, heretofore a magnet wire stripping apparatus as shown in FIGS. 18 through 20 is used.

As shown in FIGS. 18 through 20, in the conventional apparatus, the magnet wire 20 is passed through a tubular wire guide 54, and three arms 51 each having a blade 52 are arranged at angular intervals of 120° around the wire guide 54.

Each of the arms 53 is mounted on a shaft 56 in such a manner that it is rotatable in a plane including the central axis of the wire guide 54, and is so urged that the edge of the blade 52 is brought into contact with the magnet wire 20.

The wire guide 54 is movable longitudinally with respect to the arms 51, so that the arms 52 are swingable from the positions where the edges of the blades 51 are in contact with the magnet wire 20 to the positions where they leave the magnet wire 20.

As shown in FIG. 20, the arms 51 are able to turn around the magnet wire 20 together with the wire guide 54 with the edges of the blades 52 kept in contact with the magnet wire.

With the apparatus, the magnet wire is stripped as follows: With the magnet wire 20 protruded from the wire guide in the direction of the arrow as shown in FIG. 19, the arms 51 are moved downwardly while being turned around the magnet wire in the above-described manner. In this operation, the edges of the blades 52 are brought into contact with the magnet wire 20 while drawing spiral lines on it. As a result, as shown enlarged in FIG. 21, the insulating layer is removed from the magnet wire 20 as indicated at 20c.

After the stripping operation, the wire guide 54 is moved upwardly in FIG. 19, and the arms 51 are turned against the arm urging forces until the edges of the blades 52 are moved away from the magnet wire.

In the above-described magnet wire stripping apparatus, a plurality of arms having blades are arranged radially around the magnet wire. That is, the arms occupy a relatively large space radially of the magnet wire. Hence, sometimes it is difficult to set the apparatus in the limited space in a given winding machine, or it is difficult for the apparatus to operate in the limited space.

On the other hand, the apparatus, being made up of the wire guide, the arms having the blades, and the shafts rotatably supporting those arms, is unavoidably intricate in construction.

In the case where, as shown in FIG. 22, a winding 22 is formed by winding a magnet wire 20 on a protruded pole 21 of the armature of a motor, and it is required to remove the insulating layer from the end portions of the magnet wire 20; in order to bring the edges of the blades 52 into contact with the magnet wire 20 by turning the arms 51 in planes including the central axis of the magnet wire 20 it is necessary to turn the arms 51 in such a manner that the edges of the blades 52 are not brought into contact with the winding 22. Hence, the portion L1 of the magnet wire which corresponds to the dimension of the blade 52 cannot be striped. In other words, it is impossible to strip the magnet wire from exactly beside the winding 22.

SUMMARY OF THE INVENTION

Accordingly, an object of the invention is to provide a method of stripping an insulated magnet wire, and an apparatus for practicing the method, which is simple and compact in construction, and can be set in a limited spaced and can be operated in the limited space, and which, for instance when a winding is formed by using an insulated magnet wire, is able to strip the magnet wire from just beside the winding.

According to an aspect of the present invention, there is provided a method of stripping an insulated magnet wire which comprises steps of: pushing the magnet wire against an arcuate guide surface; holding the magnet wire in semi-circular stripping cuts which are formed in a pair of clamping parts, respectively, the semi-circular stripping cuts swingable about a fulcrum so as to be opened and closed; and moving either the pair of clamping parts having the stripping cuts or the magnet wire to strip the magnet wire.

According to an aspect of the present invention, there is provided an apparatus for stripping an insulated magnet wire comprising: an arcuate guide surface against which the magnet wire is pushed so as to fix the magnet wire in position; a pair of clamping parts provided close to the arcuate guide surface, the pair of clamping parts closing and opening by being swung about a fulcrum; and semi-circular stripping cuts provided with the clamping parts, the clamping parts adapted to hold the magnet wire therein which has been fixed in position by the arcuate guide surface.

In the apparatus of the invention, the magnet wire is pushed against the arcuate guide surface of the guide member, and is then held in the semi-circular stripping cuts formed in the pair of clamping parts forming the clamp tool which are opened and closed by being swung about the fulcrum. Under this condition, the clamp tool is moved along the magnet wire, so that the latter is stripped by the semi-circular stripping cuts of the clamping parts. That is, the apparatus of the invention, unlike the conventional one, has no members which are opened and closed or moved around the magnet wire. Hence, the apparatus of the invention can be set in a limited space, and can be operated in the limited space. In addition, the apparatus is simple in construction.

Since the apparatus can be set in a limited space and can be operated in the limited space, after the formation of a winding with an insulated magnet wire, the insulated magnet wire can be stripped from exactly beside the winding.

Furthermore, in the apparatus of the invention, the semicircular stripping cuts of the clamping parts forming the clamp tool are each tapered in such a manner that its inside diameter is larger in the direction of movement of the clamping parts along the magnet wire. Hence, in the wire stripping operation, the resistance force applied to the magnet wire is small, and therefore even a small-diameter insulated magnet wire is scarcely broken during the stripping operation.

Moreover, according to another aspect of the invention, with the magnet wire fixedly held by the stationary guide and the movable guide, the clamp tool is moved to strip the magnet wire. That is, even if the guide wire is not held stretched tight, it can be stripped according to the invention.

DETAILED DESCRIPTION OF THE PREFERRED EMBODIMENTS

Figure 1A:
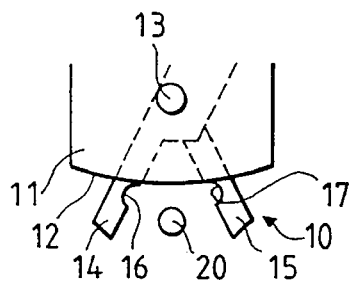
FIGS. 1a, 1c, 1e, and 1g and FIGS. 1b, 1d and 1f are front views and side views, respectively, for a description of a method of stripping an insulated magnet wire stripping method and an apparatus for practicing the method, which constitute a first embodiment of the invention, showing operating steps in order.

Preferred embodiments of the invention will be described with reference to FIGS. 1 through 17.

First Embodiment

First, a clamp tool 10 in a magnet wire stripping apparatus, which constitutes a first embodiment of the invention will be described.

Roughly stated, the clamp tool 10 comprises: a guide member 11; a pair of clamping parts 14 and 15; arms 14a and 15a integral with the clamping parts. 14 and 15; a spring 28 interposed between the arms 14a and 15a; and a shaft 13 on which the clamping parts 14 and 15 are rotatably mounted.

As shown in FIG. 1, the aforementioned guide member 11 is in the form of a flat plate which has an arcuate guide surface 12.

The shaft 13 is extended in the direction of thickness of the guide member 11. The pair of clamping parts 14 and 15 forming the clamp tool 10 are rotatably mounted on the shaft 13.

The pair of clamping parts 14 and 15 are opened and closed by being moved symmetrically with respect to the magnet wire 20 by a drive mechanism (described later).

Semi-circular stripping cuts 16 and 17 are formed in the inner surfaces of the pair of clamping parts which are confronted with each other. Of course, it is applicable for employing another shape applied to the inner surface of the clamping parts.

The arcuate guide surface 12 of the guide member 11 may be formed along the locus of the upper ends of the stripping cuts 16 and 17. At any rate, when the clamping parts 14 and 15 are closed, the upper ends of the stripping cuts 16 and 17 should be on the edge of the arcuate guide surface 12.

In the first embodiment, with the space occupied by the apparatus taken into consideration, the guide member 11 is provided on one side of the pair of clamping parts 14 and 15; however, two guide members 11 may be provided on both sides as the case may be.

Now, it is assumed that one winding has been formed by winding a magnet wire with a winding machine, and it is required to strip an end portion of the magnet wire.

Figure 1B:
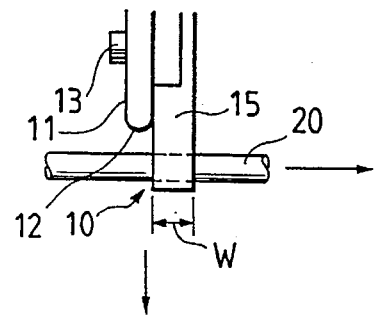
Figure 1C:
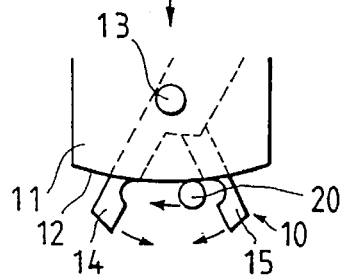
Figure 1D:
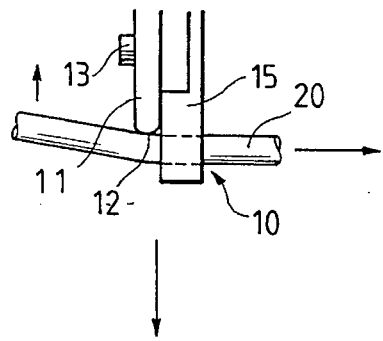

FIGS. 1a and 1b show the magnet wire of the winding which has been formed.

In the first embodiment, the magnet wire 20 is held strained by pulling both ends (not shown).

In the case of FIGS. 1(a) and (a'), the pair of clamping parts 14 and 15 forming the clamp tool 10 are opened, and the guide member 11 is positioned above the magnet wire 10 which is held strained.

When the winding operation is ended, the guide member 11 is moved downwardly, and, as shown in the parts c and d of FIG. 1, the arcuate guide surface 12 abuts against the magnet wire 20, to slightly bend the latter 20.

Figure 1E:
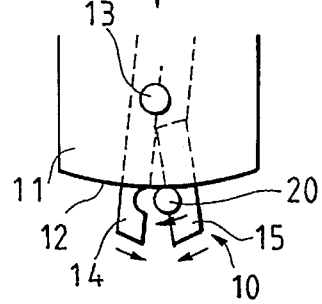
Figure 1F:
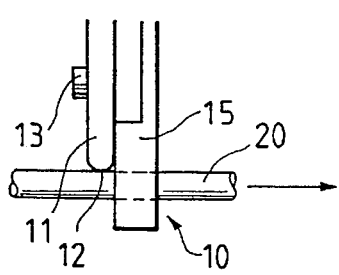

Thereafter, as shown in FIGS. 1e and 1f, the clamping parts 14 and 15 are closed by the drive mechanism (described later).

In this case, the magnet wire 20 may not be positioned at the center of the arcuate guide surface 12. However, the magnet wire 20 is moved along the arcuate guide surface 12 to the center as the pair of clamping parts 14 and 15 are closed.

Figure 1G:
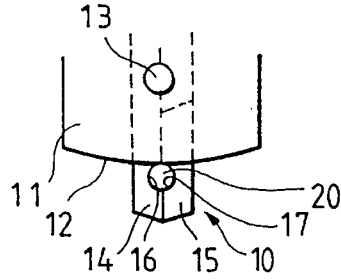

When the clamping parts 14 and 15 have been completely closed as shown in FIG. 1g, the magnet wire 20 is caused to move into the stripping cuts 16 and 17, thus being clamped by the clamping parts 14 and 15, because the upper ends (in FIG. 1g of the semi-circular stripping cuts 16 and 17 formed in the clamping parts 14 and 15 are on the edge of the arcuate guide surface 12.

Under this condition, the clamp tool 10 is moved along the magnet wire 20 together with the guide member 11 by the drive mechanism (described later); that is, it is moved in a direction perpendicular to the surface of the drawing, so that the insulating layer is removed from the magnet wire by the stripping cuts 16 and 17.

After the removal of the insulating layer, the above-described operations are carried out in the reverse order, so that the movable elements of the apparatus are returned to the original position.

The semi-circular stripping cut 17 is as shown in FIG. 2c. The other stripping cut 16 is completely equal to the stripping cut 17.

Figure 2A:
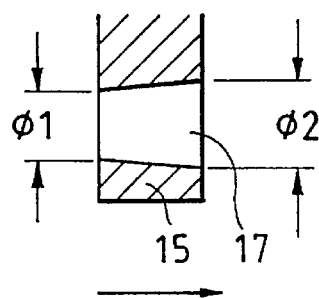
FIG. 2a and 2b are sectional views showing examples of semi-circular stripping cuts in the first embodiment.

The stripping cut 17, as shown in FIG. 2d, is in the form of a taper. More specifically, assuming that the clamp tool 10 is moved in the direction of the arrow in FIG. 2a to remove the insulating layer from the magnet wire 20, the opening of the stripping cut 17 in the front surface of the clamping part 15 as viewed in the direction of movement of the clamp tool 10 is different in inside diameter from the opening of the stripping cut in the rear surface of the clamping part 15 as viewed in the same direction (i.e., the rightmost inside diameter is different from the leftmost inside diameter in FIG. 2a.

The configuration of the stripping cut is not limited to that which has been described above. In the first embodiment, the stepping cuts is in the form of a taper, with the rightmost inside diameter $\phi 2$ being larger than the leftmost inside diameter $\phi 1$.

Figure 3:
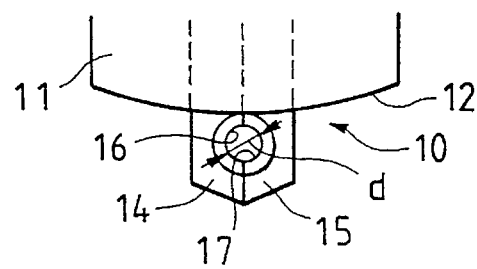
FIG. 3 is a front view showing in detail a pair of clamping parts (forming a clamp tool) in the first embodiment which are adapted to clamp a magnet wire.
Figure 4A:
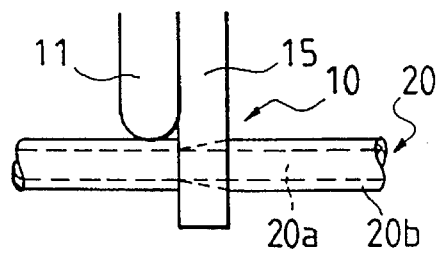
FIG. 4a and 4b are side views showing operating steps in order in stripping the magnet wire by moving the clamp tool in the first embodiment.
Figure 4B:
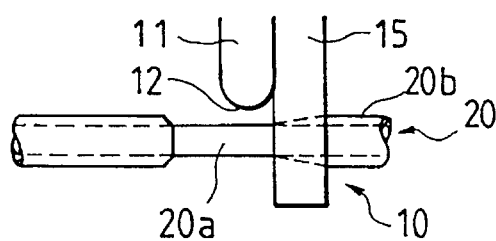

As shown in FIGS. 4a and 4b, the magnet wire 20 comprises a conductor 20a and an insulating layer 20b formed on the conductor 20a. Therefore, as shown in FIG. 3, the minimum inside diameter d of the semi-circular stripping cuts 16 and 17 is substantially equal to the diameter of the conductor 20a of the magnet wire 20.

Hence, as the clamp tool 10 is moved along the magnet wire 20 under the condition that the magnet wire 20 is held in the stripping cuts 16 and 17 of the clamping parts 14 and 15, the insulating layer 20b is removed from the magnet wire 20 as shown in FIG. 4a and 4b. In this operation, the length of the part of the magnet wire 20 from which the insulating layer 20b has been removed corresponds to the amount of movement of the clamp tool 10.

Since the stripping cuts 16 and 17 are tapered as was described above, during the stripping operation the magnet wire 20 will never be broken, and only the insulating layer 20b is removed from the wire 20.

If each of the stripping cuts 16 and 17 is not in the form of a taper (being equal in inside diameter), then the following difficulties will be involved. In removing the insulating layer, the resistance force is considerably great, and a magnet wire small in diameter may be broken.

If the stripping cuts 16 and 17 are tapered in the opposite directions, then in moving the clamp tool 10 along the magnet wire 20, the stripping cuts 16 and 17 may bite the magnet wire 20, and at worst the wire 20 is broken.

Figure 2B:
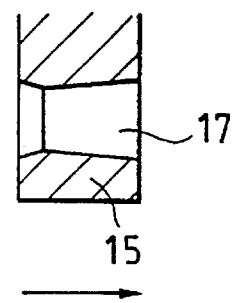

On the other hand, in the case where the magnet wire is so large in diameter that it may not be broken, each of the stripping cuts 16 and 17 may be constant in inside diameter, or the stripping cuts 16 and 17 may be tapered in the opposite directions. It is not always necessary that the stripping cuts 16 and 17 are each tapered in the same direction. That is, the stripping cuts may be modified as shown in FIG. 2b, in which a part of the stripping cut 17 is tapered in one direction, and the remaining part is tapered in the opposite direction.

In the above-described first embodiment, the magnet wire 20 is pushed against the arcuate guide surface 12 of the guide member, and the pair of clamping parts 14 and 15 are turned about the fulcrum 13 to hold the magnet wire 20 in the semi-circular stripping cuts 16 and 17. Under this condition, the pair of clamping parts 14 and 15 (forming the clamp tool 10) are moved along the magnet wire 20 to cause the semi-circular stripping cuts 16 and 17 to remove the insulating layer 20b from the magnet wire 20. Thus, the first embodiment is advantageous in the following point: The apparatus of the invention, unlike the conventional one, has no members which go around the magnet wire 20. Hence, the apparatus can be set in a limited space, and can be operated in the limited space, and is simple in construction.

Figure 5:
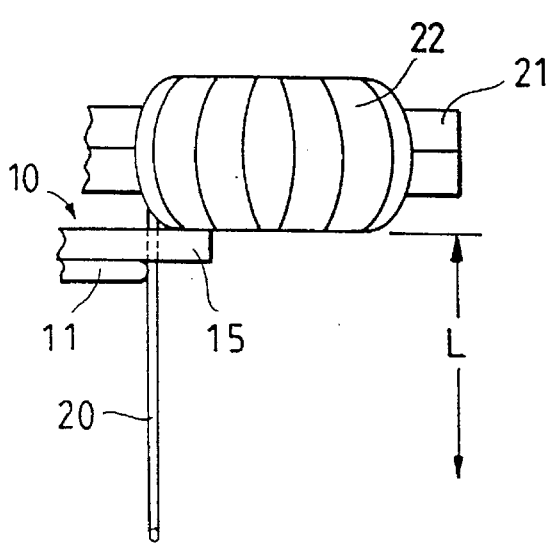
FIG. 5 is a side view showing a part of a winding, for a description of an advantage of the first embodiment.

The above-described advantage of the apparatus of the invention will become more apparent from FIG. 5.

Figure 18:
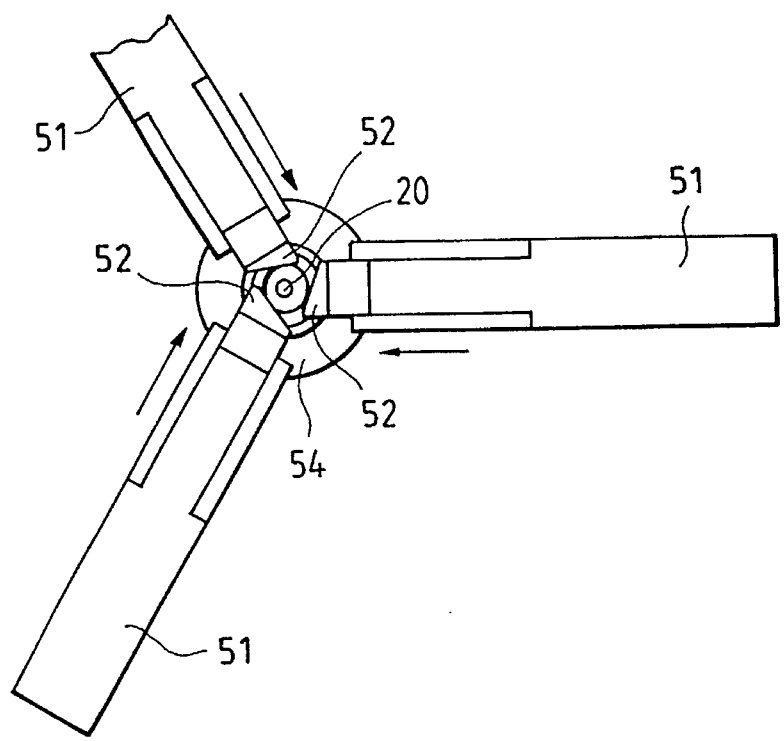
FIG. 18 is a plan view showing an example of a conventional insulated magnet wire stripping apparatus.
Figure 19:
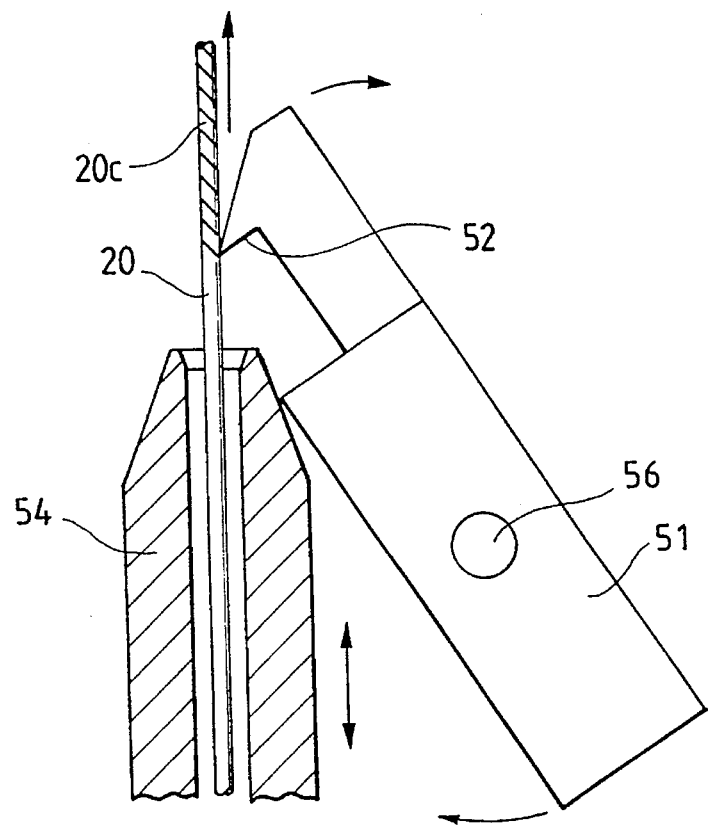
FIG. 19 is a front view, with parts cut away, of the conventional apparatus shown in FIG. 18.
Figure 20:
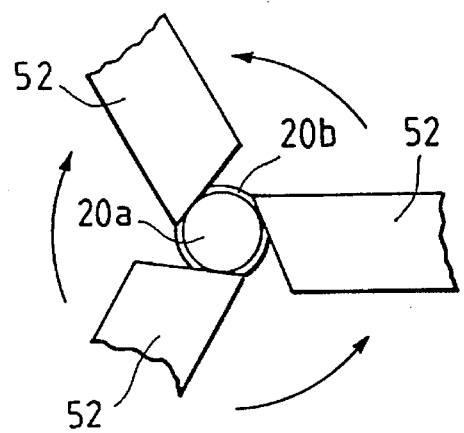
FIGS. 20 and 21 are enlarged plan views for a description of an insulated magnet wire stripping operation using the conventional apparatus.
Figure 21:
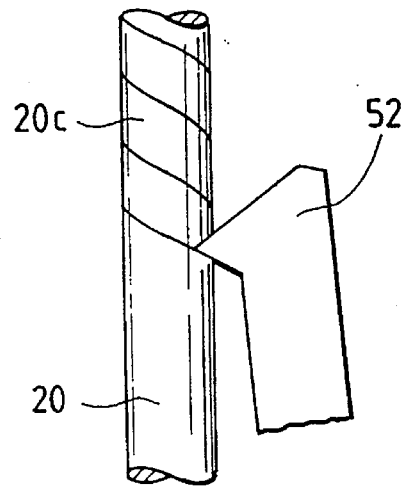
Figure 22:
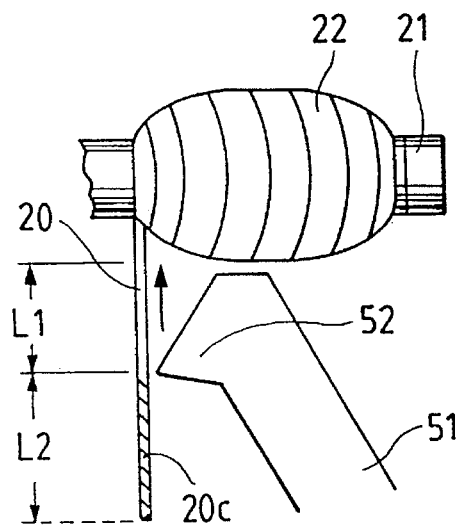
FIG. 22 is a side view for a description of difficulties accompanying the conventional apparatus.

FIG. 5 corresponds to FIG. 18 which is provided for a description of the problem accompanying the conventional apparatus. That is, the method and apparatus of the first embodiment are applied to the case where a winding 22 is formed by winding a magnet wire 20 on a protruded pole 21 of the armature of an electric motor, and it is required to strip the end portions of the magnet wire 20 of the winding 22.

With the method and apparatus of the first embodiment, the clamp tool 10 is set beside the winding 22 to clamp the magnet wire 20, and then the clamp tool 10 is moved along the magnet wire 20 to remove the insulating layer 20b from the latter 20. Hence, the magnet wire 20 is stripped from just beside the winding as much as L corresponding to the amount of movement of the clamp tool 10.

Now, a mechanism for moving the guide member 11, a mechanism for opening and closing the pair of clamping parts 14 and 15 forming the clamp tool 10, and a mechanism for moving the clamp tool 10 along a magnet wire will be described with reference to FIGS. 6 through 10.

For simplification in illustration, in FIG. 1, the pair of clamping parts 14 and 15 are rotatably mounted on the shaft 13 embedded in the guide member. In FIGS. 6 through 10, the shaft 13 is embedded in a support 25.

That is, the pair of clamping parts 14 and 15 are rotatably mounted on the support 25 through the shaft 13 (so that they can be opened and closed).

The arms 14a and 15a are extended from the clamping parts 14 and 15, and the spring 28 is interposed between those arms 14a and 15a to urge the clamping parts 14 and 15 to open.

A clamp drive member 26 is inserted in the support 25 in such a manner that it is engaged with the arms 14a and 15a and is vertically (in FIG. 6 or 7) movable. The clamp drive member 26 is urged upwardly by a suitable spring (having no reference numeral).

The lower end face of the clamp drive member 26 is recessed forming a conical surface 27, and the upper end face is abutted against the piston rod 35a of a clamp driving air cylinder 35, thus regulating the upward movement of the clamp drive member 26 by the above-described spring.

Figure 7:
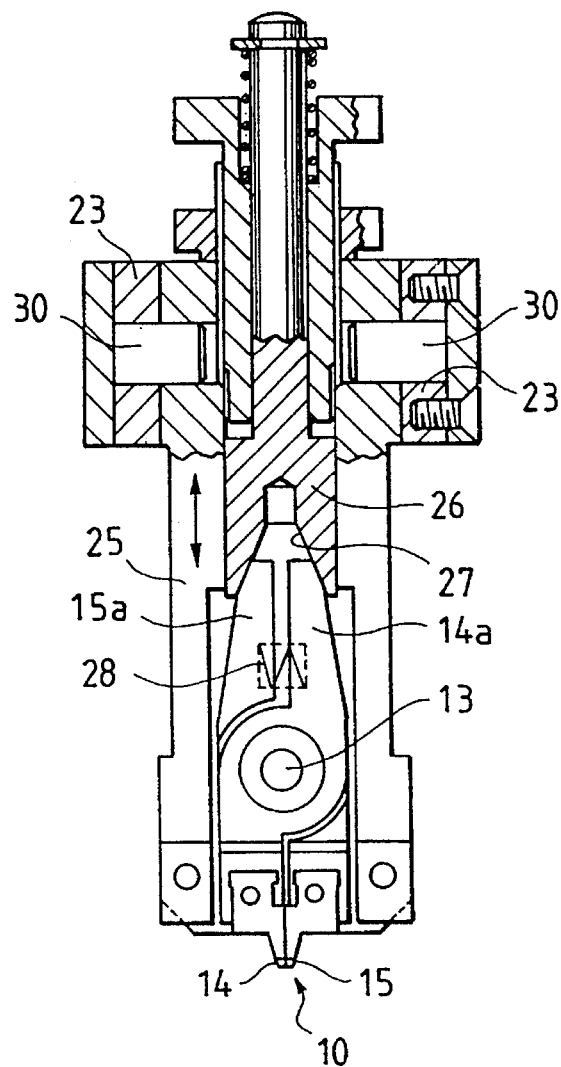
FIG. 7 is a front view, with parts cut away, showing a clamp tool opening and closing mechanism in the whole arrangement of the invention shown in FIG. 6.
Figure 8:
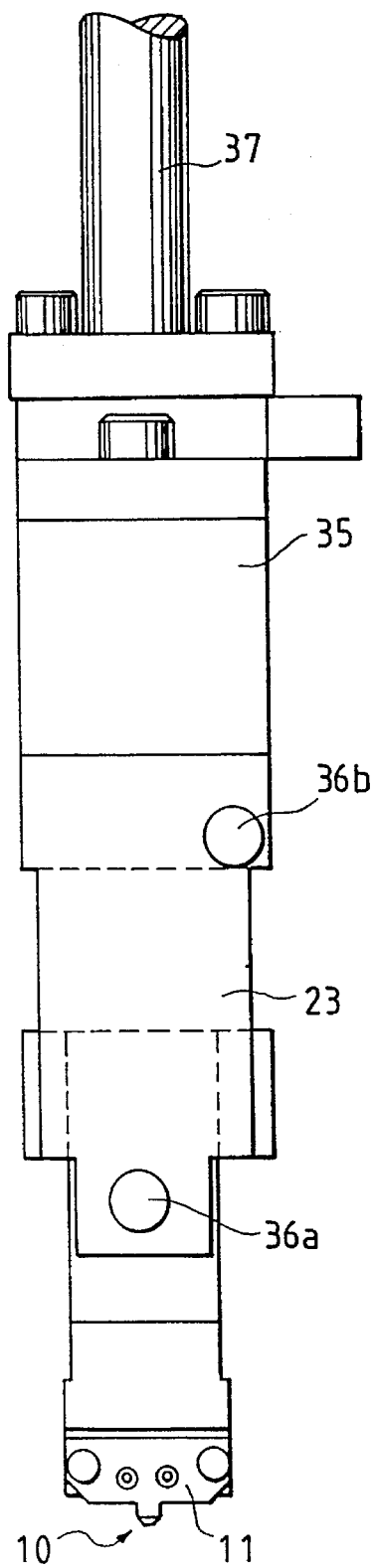
FIG. 8 is a rear view of the whole arrangement of the invention shown in FIG. 6.

A frame 23 is coupled to the lower end of the air cylinder 35 in such a manner that the form 23 is integral with the cylinder 35. As shown in FIG. 7, a pair of shafts 30 and 30 are extended through the right and left sides of the frame 23 and the right and left sides of the support 25, respectively.

That is, the support 25 is swingable about the shafts 30 and 30. Hence, the clamp tool 10 and the clamp drive member 26, being supported by the support 25, are swingable about the shafts 30 and 30 together with the support 25.

Behind the support 25 (on the left side in FIG. 6), adjusting screws 36a and 36b are screwed in the frame 23 to define the range of swing of the support 25.

Figure 6:
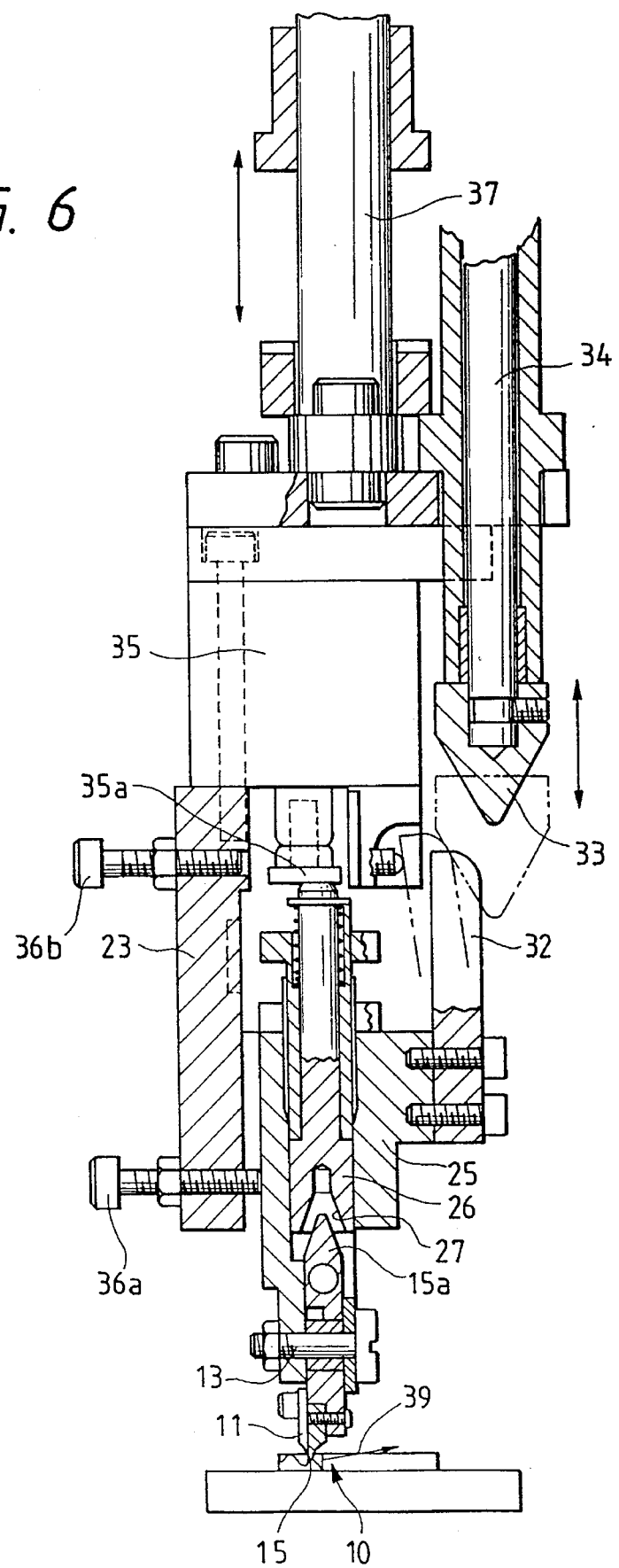
FIG. 6 is a side view, with parts cut away, showing a whole arrangement of the invention including the first embodiment and its concerned driving mechanisms.

As shown in FIG. 6, the adjusting screw 36a is abutted against the rear surface of the support 25 to limit the amount of swing of the latter 25 in a clockwise direction.

Similarly, as shown in FIG. 6, the adjusting screw 36b is abutted against the rear surface of an arm 32 (described later) of the support 25 to limit the amount of swing of the latter 25 in a counterclockwise direction.

The arm 32 is fixedly secured to the end face of the front end portion of the support 25 in such a manner that it is extended upwardly. The front surface of the free end portion of the arm 32 is engaged with a conical cam 33 to swing the support 25.

That is, the clamp tool 10 is moved (swung) longitudinally of the magnet wire.

The conical cam 33 is coupled to the lower end of the piston rod 34 of an air cylinder (not shown). The air cylinder controls the vertical position of the conical cam 33.

The conical cam 33 and the arm 32 form clamp-tool moving means for moving the clamp tool 10 longitudinally of the magnet wire 20.

The upper end of the air cylinder 35 is coupled to the piston rod 37 of another air cylinder (not shown), to vertically move all the above-described components including the clamp tool 10 (hereinafter referred to as "a main mechanism", when applicable).

In order to remove the insulating layer 20b from the magnet wire 20, first the piston rod 37 is moved downwardly to lower the main mechanism to cause the arcuate guide surface 12 to abut against the magnet wire 20 so that the main mechanism is set at a suitable position while the magnet wire 20 is strained to some extent.

Under this condition, the air cylinder 35 is driven to lower the piston rod 35a thereby to move the clamp drive member 26 against the elastic force of the spring. As a result, as shown in FIG. 9a, the conical surface 27 of the clamp drive member 26 causes the pair of arms 14a and 15a to turn towards each other in the directions of the arrows thereby to close the clamping parts 14 and 15, so that, as was described before, the magnet wire 20 is held in the semi-circular stripping cuts 16 and 17 of the clamping parts 14 and 15.

Under this condition, the air cylinder (not shown) having the piston rod 34 is driven to move the latter 34 downwardly to cause the conical surface of the conical cam 33 to move the arm 32 downwardly, so that the support 25, the clamp drive member 26, and the clamp tool 10 are swung counterclockwise in FIG. 6.

Figure 10A:
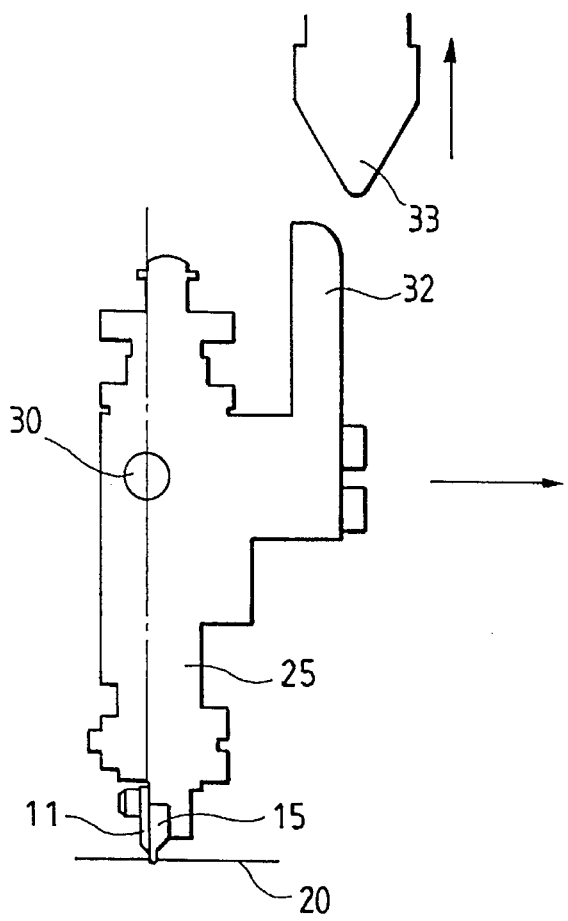
FIGS. 10a and 10b are side views for a description of the movement of the clamp tool along the magnet wire.
Figure 10B:
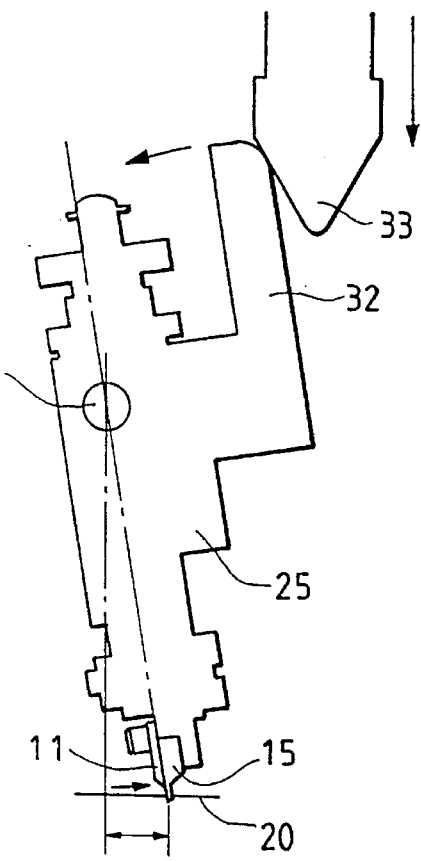

As shown in FIG. 10b, the end portion of the clamp tool 10 holding the magnetic wire is moved substantially longitudinally of the magnet wire while describing an arc as indicated by the arrow 39 in FIG. 6, so that the magnet wire 20 is stripped in correspondence to the amount of movement of the clamp tool 10.

Figures 9A, 9B:
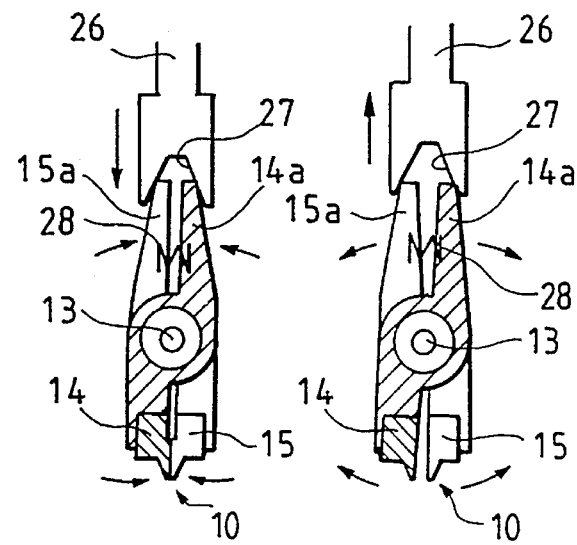
FIGS. 9a and 9b are front views for a description of the opening and closing operations of the clamp tool.

In this operation as shown in FIG. 9a and 9b, the upper end of the clamp drive member 26 slides on the lower end face of the piston rod 35a of the air cylinder 35; that is, the movement of the clamp drive member 26 relative to the piston rod 35a is permitted, while the magnet wire 20 is maintained clamped by the clamp tool 10.

After the magnet wire 20 has been stripped in the above-described manner, the support 25, the clamp drive member 26, and the clamp tool 10 are returned to the original positions as follows:

First, the piston rod 35a is moved upwardly. As the piston rod 35a is moved in this way, the clamp drive member 26 is also moved upwardly by the elastic force of the spring. As a result, the clamp tool 10 is opened by the elastic force of the spring 28.

Next, the air cylinder with the piston rod 37 is driven to move the conical cam 33 upwardly as shown in FIG. 10a; that is, to move the conical cam 33 away from the arm 32, so that the support 25, the clamp drive member 26, and the clamp tool 10 are swung clockwise about the pair of shafts 30. Thereafter, the piston rod 37 shown in FIG. 6 is moved upwardly, to disengage the guide member 11 from the magnet wire 20.

In the apparatus shown in FIGS. 6 through 10, the air cylinders are used to move the guide member 11, and to open and close the clamp tool 10, and to move the latter 10 longitudinally of the magnet wire 20; however, those driving means may be replaced with other suitable means such as motors and solenoids, and their mechanisms also may be replaced by other suitable ones.

Second Embodiment

In the above-described first embodiment, the apparatus is moved in its entirety so that the magnet wire 20 is abutted against the arcuate guide surface 12 of the guide member 11. However, the apparatus of the first embodiment may be modified as shown in FIG. 11. That is, in the second embodiment, a guide member 41 is stationary, and a magnet wire. 20 is abutted against the arcuate guide surface 42 of the guide member 41 through a press-down member 50.

In FIG. 11, reference numerals 44 and 45 designate a pair of clamping parts forming a clamp tool 40; 46 and 47, semi-circular stripping cuts formed in the confronted inner surfaces of the clamping parts 44 and 45, respectively; and 43, a shaft on which the clamping parts 44 and 45 are rotatably mounted.

Figure 11A:
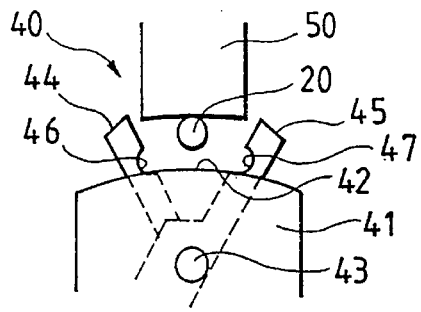
FIG. 11a to 11d are front views for a description of a method of stripping an insulated magnet wire strip and an apparatus for practicing the method, which constitute a second embodiment of the invention, showing operating steps in order.

FIG. 11a shows a state of the apparatus of the second embodiment that the magnet wire 20 is not stripped yet; that is, the magnet wire 20 is away from the arcuate guide surface 42 of the guide member 41.

Figure 11B:
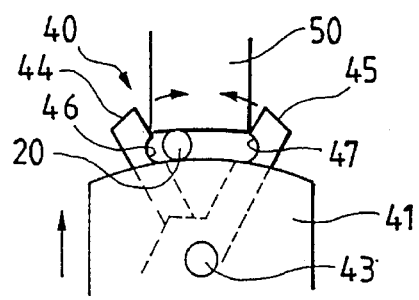

Under this condition, the press-down member 50 is moved as shown in FIG. 11b to push the magnet wire 20 against the arcuate guide surface 41 to fixedly position the magnet wire in a vertical direction.

Figure 11C:
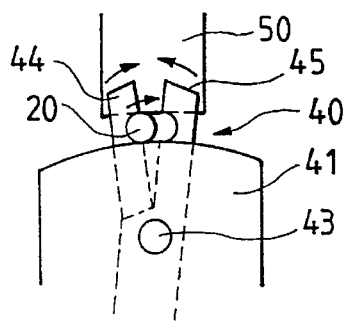
Figure 11D:
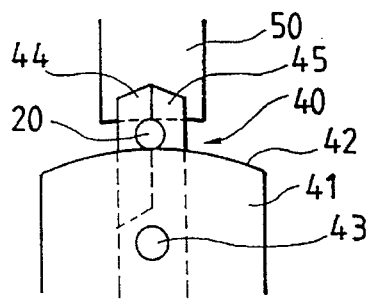

Thereafter, as shown in FIG. 11c, the pair of the clamping parts 44 and 45 are closed to hold the magnet wire 20 in the stripping cuts 46 and 47. Then, similarly as in the case of the first embodiment, the clamp tool 40 is moved along the magnet wire 20 to strip the latter 20.

Figure 12:
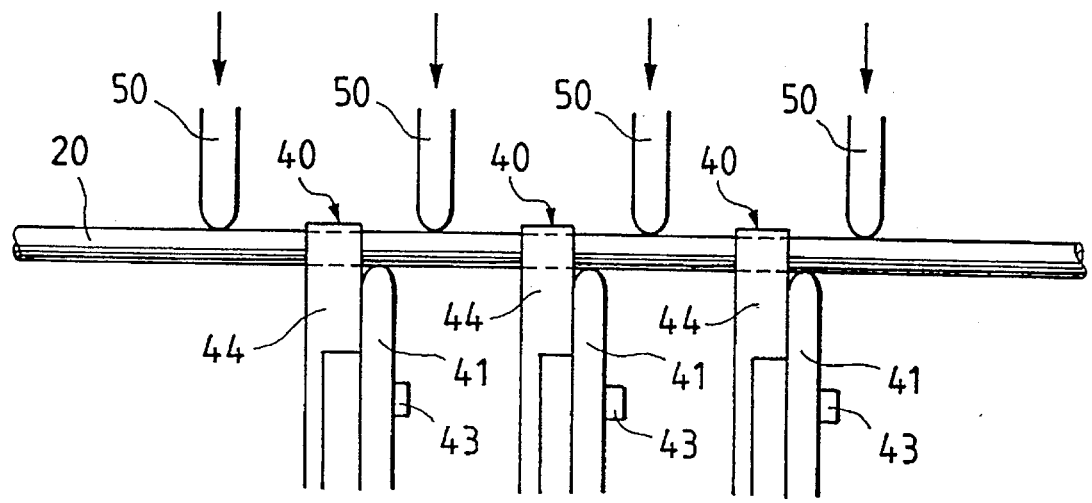
FIG. 12 is a side view showing an application of the insulated magnet wire stripping apparatus of the second embodiment.

FIG. 12 shows one application of the apparatus shown in FIG. 11. That is, in the application, a plurality of the apparatus shown in FIG. 11 are arranged along the magnet wire 20, so that a plurality of parts of the latter 20 are stripped at the same time.

Third Embodiment

FIG. 13 shows a third embodiment of the invention, in which a pair of clamping parts 114 and 115 forming a clamp tool 100 have their own centers of rotation (or fulcrums).

Similarly as in the case of the above-described first and second embodiments, the pair of clamping parts 114 and 115 have stripping cuts (not shown) in their lower end portions, respectively.

In order to swing the clamping parts 114 and 115 independently of each other, the clamping part 114 is rotatably mounted on a shaft 131 serving as the center of rotation; while the clamping part 115 is also rotatably mounted on a shaft 132.

The clamping parts 114 and 115 have semi-circular stripping cuts (not shown), respectively, to hold a magnet wire. The clamping parts 114 and 115 are urged by a spring interposed between them so that the stripping cuts are moved away from each other.

Rollers 121 and 122, which are cam followers, are provided on the upper end portions of the clamping parts 114 and 115, respectively. A conical cam 126 is moved in between those rollers or moved out of them by suitable driving means.

Figure 13A:
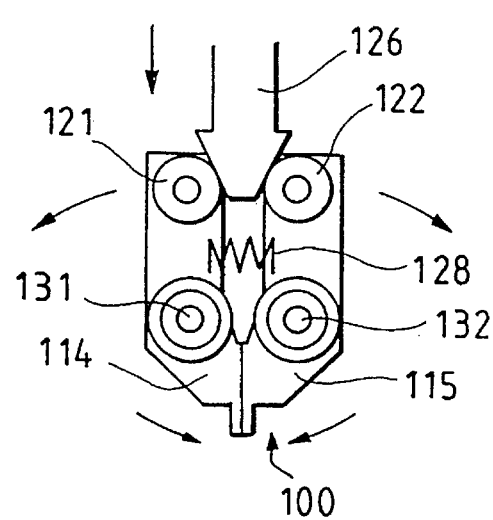
FIG. 13a and 13b are side views showing essential components of an insulated magnet wire stripping apparatus, which constitutes a third embodiment of the invention, for a description of an operation of the latter.

In the case of FIG. 13a, the cam 126 goes in between the rollers 121 and 122, to turn the pair of clamping parts 114 and 115 against the elastic force of the spring, so that the semi-circular stripping cuts (formed in the end portions of the clamping parts 114 and 115) are closed.

Figure 13B:
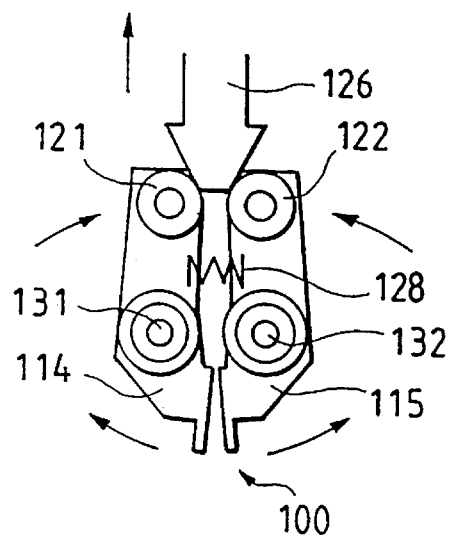

In the case of FIG. 13b, the cam 126 is disengaged from the rollers 121 and 122, so that the pair of clamping parts 114 and 115 are turned away from each other by the elastic force of the spring, whereby the semi-circular stripping cuts are opened (moved away from each other).

In the third embodiment, the pair of clamping parts have their own shafts serving as their centers of rotation. Therefore, in the third embodiment, the arcuate guide surface of the guide member adapted to control the position of the magnet wire is formed along the path swept by the semi-circular stripping cuts (not shown), or it is so formed that, when the clamping parts are closed, the arcuate guide surface meets the semi-circular stripping cuts of the clamping parts.

Fourth Embodiment

The technical concept of the invention may be applied to the case where the magnet wire cannot be held strained because it has been cut off.

FIGS. 14 through 17 show a magnet wire stripping apparatus applicable to this case, which constitutes a fourth embodiment of the invention.

Figure 14A:
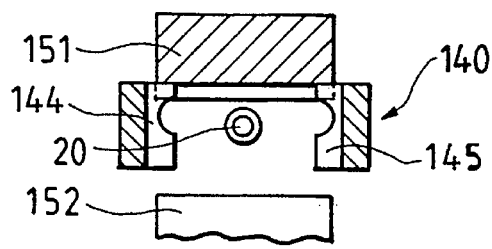
FIGS. 14a, 14b and 14c are a sectional plan view, a front view, and a sectional side view, respectively, showing an insulated magnet wire stripping apparatus, which constitutes a fourth embodiment of the invention.
Figure 14B:
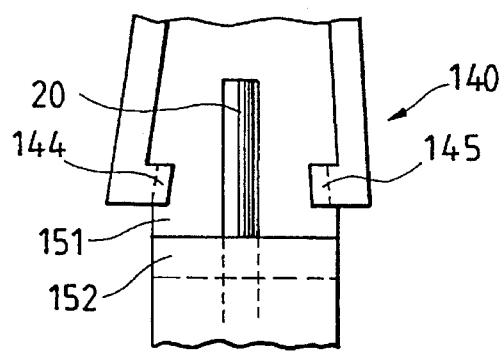

As shown in FIGS. 14a and 14b, a magnet wire 20 is set vertical but free at the end; that is, it cannot be stretched tight.

On one side of the magnet wire 20, a stationary guide 151 is provided along the magnet wire 20. On the other side of the magnet wire 20, a movable guide 152 is provided in such a manner that it is confronted through the magnet wire 20 with the stationary guide 151. The movable guide 152 is movable back and forth in a horizontal plane.

A clamp tool 140 is set over the front surface of the stationary guide 151. The clamp tool 140 is similar in construction to those in the above-described first, second and third embodiments; that is, it is made up of a pair of clamping parts 144 and 145 which are opened and closed by being swung in a vertical plane.

The upper end portion (or the free end portion) of the magnet wire 20 enters the space which is defined by the clamp tool 140 opened, the stationary guide 151, and the movable guide 152.

Figure 14C:
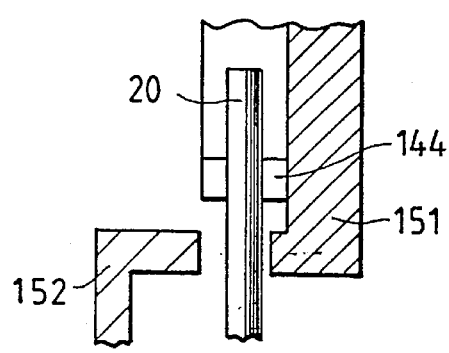
Figure 15A:
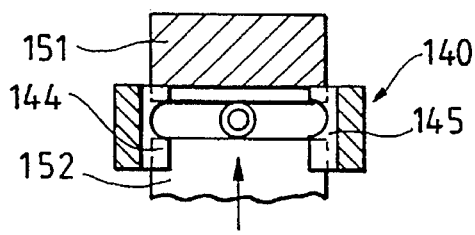
FIGS. 15a to 15c are a sectional plan view, a front view, and a sectional side view, respectively, for a description of a behavior of the apparatus shown in FIG. 14.
Figure 15B:
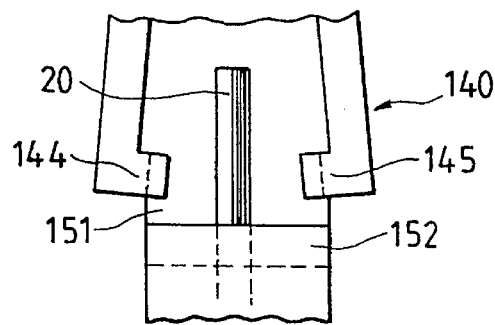
Figure 15C:
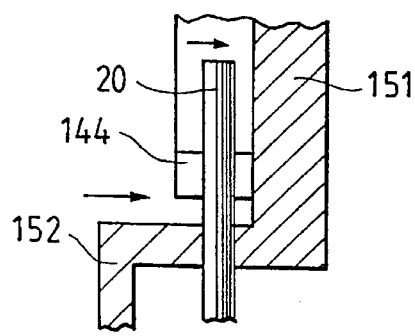

With the apparatus of the fourth embodiment, the magnet wire 20 is stripped as follows: Under the condition that the magnet wire, the clamp tool, and the stationary guide, and the movable guide are held as shown in FIG. 14, the movable guide 152 is moved towards the magnet wire 20 as shown in FIG. 15 until the wire 20 is pushed against the stationary guide 151; that is, the free end portion of the magnet wire 20 is fixedly held between the stationary guide 151 and the movable guide 152.

Figure 16A:
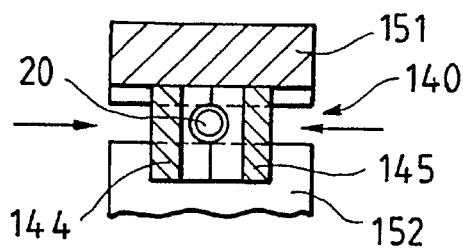
FIG. 16a to 16c are also a sectional plan view, a front view, and a sectional side view, respectively, for a description of another behavior of the apparatus shown in FIG. 14.
Figure 16B:
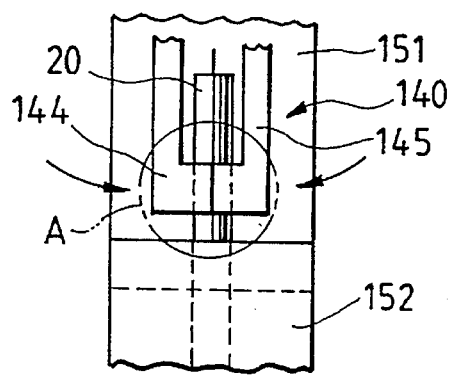
Figure 16C:
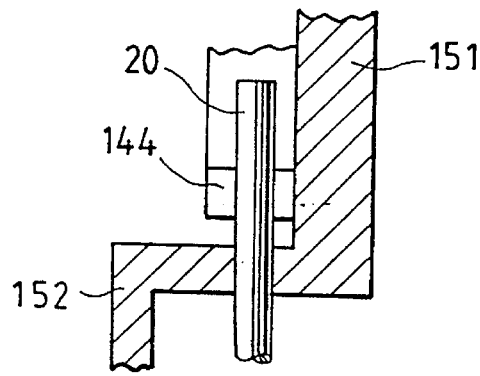
Figure 17A:
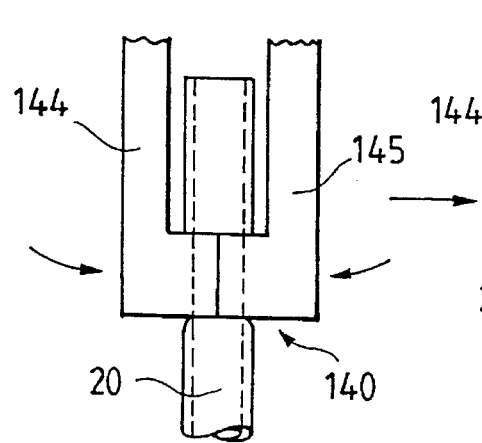
FIGS. 17a to 17c are front views, corresponding to the encircled portion A in FIG. 16 (b) of FIG. 16, showing operating steps in order in stripping an insulated magnet with the clamp tool.
Figures 17B, 17C:
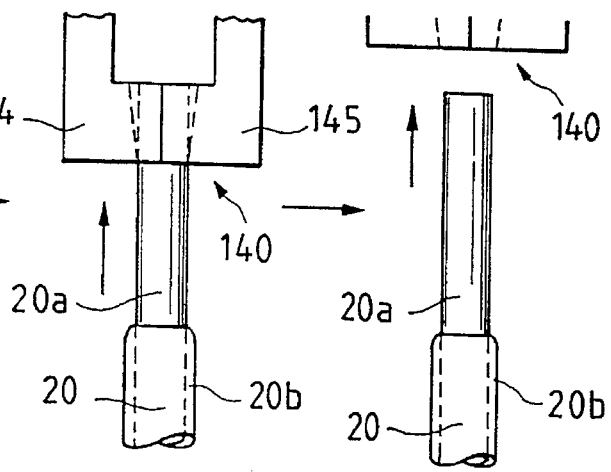

Under this condition, as shown in FIG. 16 the pair of clamping parts 144 and 145 forming the clamp tool 140 are closed to hold the upper end portion of the magnet wire 20.

Thereafter, the clamp tool 140 is moved upwardly along the magnet wire 20. As was described above, the clamp tool 140 is equivalent in construction to those in the first, second and third embodiment. Therefore, as the clamp tool is moved in the above-described manner, the insulating layer 20b is removed from the upper end portion of the magnet wire 20, to expose the conductor 20a.

If summarized, in the fourth embodiment, with the free end portion of the magnet wire 20 fixed by the stationary guide 151 and the movable guide 152, the clamp tool is moved along the magnet wire 20. Hence, with the apparatus, even if the magnet wire has a free end portion, it can be stripped.

In the apparatus of the invention, the magnet wire is pushed against the arcuate guide surface of the guide member, and is then held in the semi-circular stripping cuts formed in the pair of clamping parts forming the clamp tool which are opened and closed being swung about the fulcrum. Under this condition, the clamp tool is moved along the magnet wire, so that the latter is stripped by the semi-circular stripping cuts of the clamping parts. That is, the apparatus of the invention, unlike the conventional one, has no members which are opened and closed or moved around the magnet wire. Hence, the apparatus of the invention can be set in a limited space, and can be operated in the limited space. In addition, the apparatus is simple in construction.

Since the apparatus can be set in a limited space and can be operated in the limited space, after the formation of a winding with an insulated magnet wire, the insulated magnet wire can be stripped from exactly beside the winding.

Furthermore, in the apparatus of the invention, the semi-circular stripping cuts of the clamping parts forming the clamp tool are each tapered in such a manner that its inside diameter is larger in the direction of movement of the clamping parts along the magnet wire. Hence, in the wire stripping operation, the resistance force applied to the magnet wire is small, and therefore even a small-diameter insulated magnet wire is scarcely broken during the stripping operation.

Moreover, according to another aspect of the invention, with the magnet wire fixedly held by the stationary guide and the movable guide, the clamp tool is moved to strip the magnet wire. That is, even if the guide wire is not held stretched tight, it can be stripped according to the invention.

What is claimed is:

1. A method of stripping an insulated magnet wire which comprises steps of:

deflecting the insulated magnet wire by contacting the insulated magnet wire with an arcuate guide surface of a guide member;

pivoting a pair of clamping parts having stripping portions about a pivot point so as to contact the insulated magnet wire and move the insulated magnet wire along the arcuate guide surface of the guide member until the insulated magnet wire is clamped between the clamping parts at the stripping portions; and moving either the pair of clamping parts having the stripping portions or the insulated magnet wire in a direction of a longitudinal axis of the insulated magnet wire to strip the insulated magnet wire.

2. A method of stripping an insulated magnet wire as recited in claim 1, wherein in said step of pivoting the pair of clamping parts, the pair of clamping parts are pivoted so that a path swept by the stripping portions follows the arcuate surface of the guide member.

3. A method of stripping an insulated magnet wire as recited in claim 1, wherein in said step of pivoting the pair of clamping parts, the pair of clamping parts are pivoted so that when the insulated wire is clamped between the clamping parts at the stripping portions, the arcuate guide surface is adjacent to the stripping portions.

4. A method of stripping an insulated magnet wire as recited in claim 1, wherein said step of pivoting the pair of clamping parts comprises steps of:

inserting and retracting a cam between the pair of clamping parts to open and close the pair of clamping parts.

5. A method of stripping an insulated magnet wire which comprises steps of:

contacting the insulated magnet wire with a press-down member to deflect the insulated magnet wire and press the insulated magnet wire against an arcuate guide surface of a guide member;

pivoting a pair of clamping parts having stripping portions about a pivot point so as to contact the insulated magnet wire and move the insulated magnet wire along the arcuate guide surface of the guide member until the insulated magnet wire is clamped between the clamping parts at the stripping portions; and moving either the pair of clamping parts having the stripping portions or the insulated magnet wire in a direction of a longitudinal axis of the insulated magnet wire to strip the insulated magnet wire.

6. An apparatus for stripping an insulated magnet wire comprising:

a guide member having an arcuate guide surface for deflecting and guiding the insulated magnet wire; and a pair of clamping parts having wire stripping portions, the pair of clamping parts being pivotable about a pivot point so as to contact the insulated magnet wire and move the insulated magnet wire along the arcuate guide surface of the guide member until the insulated magnet wire is clamped between the clamping parts at the wire stripping portions.

7. An apparatus as claimed in claim 2, wherein each of the wire stripping portions is tapered in such a manner that an inside diameter thereof is larger in a direction of movement of the pair of clamping parts along the insulated magnet wire.

8. An apparatus as claimed in claim 2, wherein the pair of clamping parts include a pair of arms, respectively, in such a manner that the arms are integral with the clamping parts, and a spring is interposed between the pair of arms.

9. An apparatus as claimed in claim 2 further comprising:

an opening and closing mechanism for swinging the pair of clamping parts about the pivot point so as to open and close the clamping parts.

10. An apparatus as claimed in claim 2 further comprising:

a moving mechanism for moving one of the pair of clamping parts having the stripping portions and the insulated magnet wire longitudinally of the insulated magnet wire, to strip the insulated magnet wire.

11. An apparatus for stripping an insulated magnet wire as recited in claim 6, wherein the pivot point is disposed so that a path swept by the stripping portions follows the arcuate surface of the guide member.

12. An apparatus for stripping an insulated magnet wire as recited in claim 6, wherein the pivot point is disposed so that when the insulated wire is clamped between the clamping parts at the stripping portions, the arcuate guide surface is adjacent to the stripping portions.

13. An apparatus for stripping an insulated magnet wire as recited in claim 9, wherein said opening and closing mechanism comprises:

a support (25);

a clamp drive member (26) slidably supported within said support, said clamp drive member having a conical surface (27) at an end of said clamp drive member protruding from said support, said conical surface engaging outer surface portions of the pair of clamping parts so as to open and close the pair of clamping parts when the clamp drive member is slidably extended and retracted from said support;

a spring for biasing said clamp drive member in a direction to open the pair of clamping parts; and a cylinder (35) having a piston rod (35a) which contacts said clamp drive member to move said clamp drive member against a biasing force of said spring.

14. An apparatus for stripping an insulated magnet wire as recited in claim 13, wherein said support (25) is rotatably supported on a frame (23), and wherein said support (25) comprises an arm (32), said apparatus further comprising a cam (33) for contacting said arm to rotate said support in a longitudinal direction of the insulated magnet wire.

15. An apparatus for stripping an insulated magnet wire as recited in claim 6, wherein said pair of clamping parts are rotatably mounted on a shaft (13) embedded in said guide member.

16. An apparatus for stripping an insulated magnet wire as recited in claim 6, wherein said moving mechanism comprises:

frame (23); and a support (25) rotatably supported on said frame and pivotable in a longitudinal direction of the insulated magnet wire, said pair of clamping parts being rotatably supported on said support so as to be pivotable in a direction substantially transverse to the longitudinal direction of the insulated magnet wire.

17. An apparatus for stripping an insulated magnet wire as recited in claim 16, wherein said support (25) comprises an arm (32), and wherein said apparatus for stripping comprises a piston rod (34) having a cam (33), said cam contacting said arm when said piston rod is extended and retracted to rotate said support back and forth in the longitudinal direction of the insulated magnet wire.

18. An apparatus for stripping an insulated magnet wire as recited in claim 6, further comprising:

a cam disposed between said pair of clamping parts, said cam being inserted and retracted to open and close said pair of clamping parts.

19. An apparatus for stripping an insulated magnet wire comprising:

a stationary guide on which the insulated magnet wire is set so as to be fixed in position;

a movable guide moved towards the stationary guide to hold the insulated magnet wire in cooperation with the stationary guide; and a pair of pivotably supported clamping parts having wire stripping portions, wherein a free end of the insulated magnet wire is disposed in a space defined between the stationary guide, the movable guide and the pivotally supported clamping parts, the movable guide being moved towards the stationary guide to secure the free end of the insulated magnet wire between the stationary guide and the movable guide, and wherein the clamping parts are pivoted so that the wire stripping portions grip the insulated magnet wire adjacent the movable guide and the stationary guide, wherein the clamping parts are moved in a longitudinal direction of the insulated magnet wire for stripping the insulated magnet wire.

20. An apparatus for stripping an insulated magnet wire comprising:

a guide member having an arcuate guide surface for guiding the insulated magnet wire;

a press-down member for deflecting the insulated magnet wire and for pressing the insulated magnet wire against the arcuate guide surface of the guide member; and a pair of clamping parts having wire stripping portions, the pair of clamping parts being pivotable about a pivot point so as to contact the insulated magnet wire and move the insulated magnet wire along the arcuate guide surface of the guide member until the insulated magnet wire is clamped between the clamping parts at the wire stripping portions.

* * * * *